(12) United States Patent
Ling et al.

(10) Patent No.: US 11,982,894 B2
(45) Date of Patent: May 14, 2024

(54) DISPLAY PANEL AND DISPLAY DEVICE

(71) Applicant: Xiamen Tianma Micro-Electronics Co., Ltd., Xiamen (CN)

(72) Inventors: Ankai Ling, Xiamen (CN); Boping Shen, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 17/984,441

(22) Filed: Nov. 10, 2022

(65) Prior Publication Data

US 2024/0069375 A1 Feb. 29, 2024

(30) Foreign Application Priority Data

Aug. 24, 2022 (CN) .......................... 202211020682.3

(51) Int. Cl.
*G02F 1/1335* (2006.01)
(52) U.S. Cl.
CPC .. *G02F 1/133512* (2013.01); *G02F 1/133514* (2013.01); *G02F 1/133553* (2013.01)
(58) Field of Classification Search
None
See application file for complete search history.

(56) References Cited

U.S. PATENT DOCUMENTS

| | | | | |
|---|---|---|---|---|
| 2003/0218713 A1* | 11/2003 | Suzuki | ................. | G02F 1/1339 349/156 |
| 2008/0198300 A1* | 8/2008 | Okumura | ............ | G02B 6/0023 349/68 |
| 2013/0141687 A1* | 6/2013 | Wang | ................ | G02F 1/133512 349/158 |
| 2015/0301417 A1* | 10/2015 | Park | ...................... | G02F 1/1368 257/72 |
| 2017/0351152 A1* | 12/2017 | Hashiguchi | ........... | G02F 1/1345 |
| 2018/0107084 A1* | 4/2018 | Hirata | ............... | G02F 1/136286 |
| 2018/0267307 A1* | 9/2018 | Yoshida | .............. | G02F 1/13318 |
| 2019/0073968 A1* | 3/2019 | Tominaga | ............ | G09G 3/3607 |
| 2022/0384766 A1* | 12/2022 | Xiao | ..................... | H10K 59/38 |

FOREIGN PATENT DOCUMENTS

| | | | | |
|---|---|---|---|---|
| CN | 107025848 A | | 8/2017 | |
| CN | 107680496 A | | 2/2018 | |
| CN | 108227289 A | | 6/2018 | |
| CN | 109445177 A | * | 3/2019 | ....... G02F 1/133512 |
| CN | 113219696 A | * | 8/2021 | ........... G02F 1/1333 |
| CN | 113219715 A | * | 8/2021 | ....... G02F 1/133512 |
| JP | 2007011306 A | * | 1/2007 | |

* cited by examiner

*Primary Examiner* — Shan Liu
(74) *Attorney, Agent, or Firm* — Anova Law Group, PLLC

(57) ABSTRACT

A display panel and a display device are provided. The display panel includes: a display region and a non-display region at least partially surrounding the display region; a first base plate and a second base plate opposite to each other; and first reflection structures in the non-display region. The first base plate includes a first substrate. The second base plate includes a light-blocking layer. In the non-display region, the light-blocking layer includes at least one first opening. Along a first direction, the at least one first opening penetrates through the light-blocking layer. The first direction is a thickness direction of the display panel. Along the first direction, a projection of a first reflection structure overlaps a projection of a corresponding first opening of the at least one first opening.

20 Claims, 14 Drawing Sheets

DISPLAY PANEL AND DISPLAY DEVICE

CROSS-REFERENCE TO RELATED APPLICATION

This application claims the priority of Chinese Patent Application No. 202211020682.3, filed on Aug. 24, 2022, the content of which is incorporated herein by reference in its entirety.

TECHNICAL FIELD

The present disclosure generally relates to the field of display technologies and, more particularly, relates to a display panel and a display device.

BACKGROUND

In existing display panels, to shield the metal lines in a frame region to avoid the reflection of ambient light, the frame region is usually covered by a light-blocking layer to completely cover the metal lines in the frame region. In this design, different materials and patterns in a display region and the frame region are different, making the color of the display region lighter than the color of the frame region when the display panel is in an screen-off state. Therefore, the display region and the frame region form an obvious color difference that could be distinguished by human eyes, affecting user experience.

SUMMARY

One aspect of the present disclosure provides a display panel. The display panel includes: a display region and a non-display region at least partially surrounding the display region, a first base plate and a second base plate opposite to each other; and first reflection structures in the non-display region. The first base plate includes a first substrate. The second base plate includes a light-blocking layer. In the non-display region, the light-blocking layer includes at least one first opening. Along a first direction, the at least one first opening penetrates through the light-blocking layer. The first direction is a thickness direction of the display panel. Along the first direction, a projection of one first reflection structure overlaps a projection of a corresponding first opening of the at least one first opening.

Another aspect of the present disclosure provides a display device. The display device includes a display panel. The display panel includes: a display region and a non-display region at least partially surrounding the display region, a first base plate and a second base plate opposite to each other; and first reflection structures in the non-display region. The first base plate includes a first substrate. The second base plate includes a light-blocking layer. In the non-display region, the light-blocking layer includes at least one first opening. Along a first direction, the at least one first opening penetrates through the light-blocking layer. The first direction is a thickness direction of the display panel. Along the first direction, a projection of one first reflection structure overlaps a projection of a corresponding first opening of the at least one first opening.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
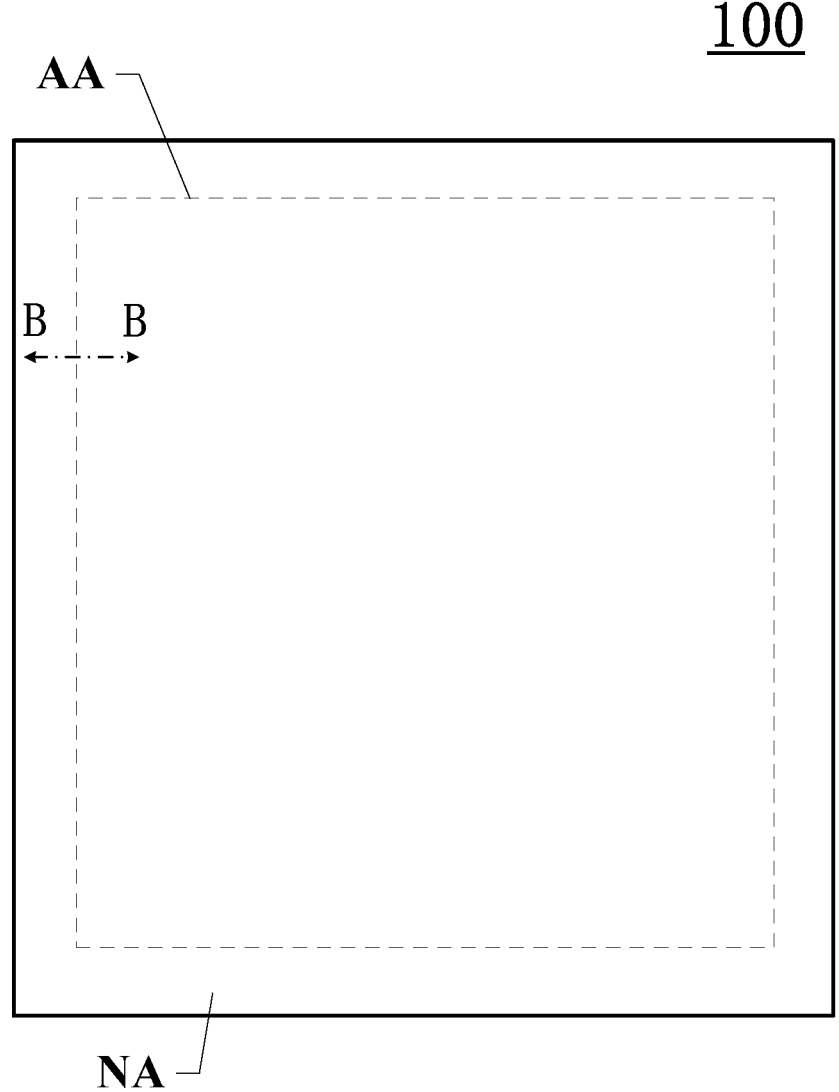
FIG. 1 illustrates an exemplary display panel consistent with various disclosed embodiments of the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

In a display panel, a color of a display region is lighter than a color of a frame region when the display panel is in an screen-off state. Therefore, the display region and the frame region form an obvious color difference that could be distinguished by human eyes, affecting user experience.

The present disclosure provides a display panel including a display region and a non-display region at least partially surrounding the display region. The display panel may further include a first base plate and a second base plate opposite to each other. The first substrate may include a first substrate. The second substrate may include a light-blocking layer and a first reflection structure. In the non-display region, the light-blocking layer may include at least one first opening, and along the first direction, the at least one first opening may penetrate through the light-blocking layer. The first direction may be a thickness direction of the display panel. The first reflection structure may be located in the non-display region. Along the first direction, the projection of the first reflection structure may overlap the projection of the first opening. By introducing the first opening and the corresponding first reflection structure in the non-display region and using the reflective function of the first reflection structure, the problem of large color difference between the display region and the frame region in the screen-off state may be alleviated. Therefore, it may be beneficial to improve the uniformity of the black state of the product under the screen-off state.

Figure 2:
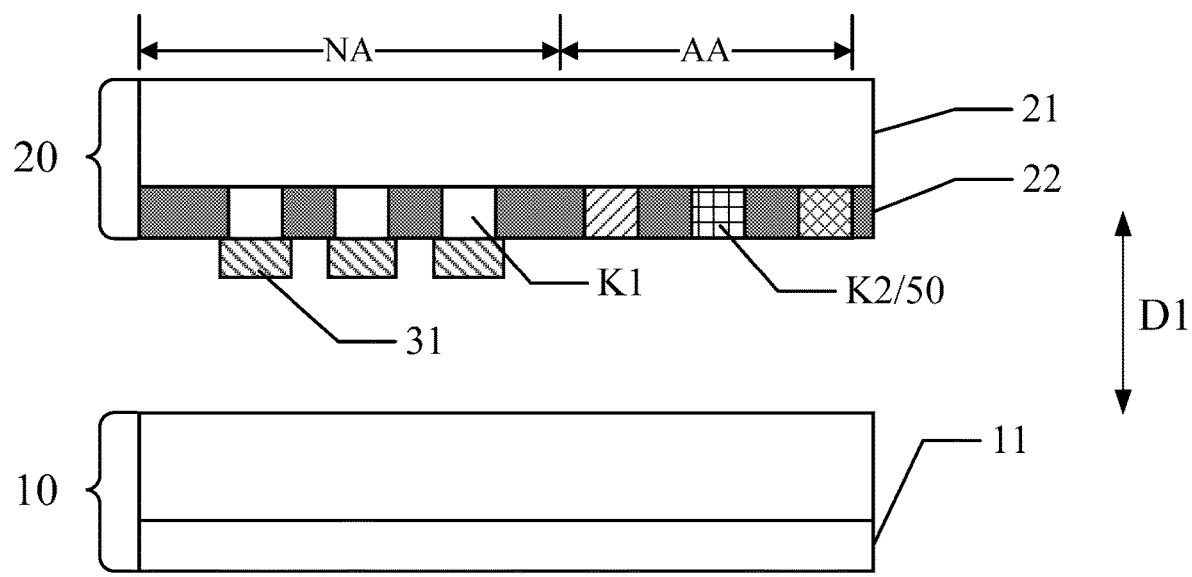
FIG. 2 illustrates a film layer structure of the display panel along a BB direction, consistent with various disclosed embodiments of the present disclosure.

FIG. 1 shows an exemplary structure of a display panel provided by one embodiment of the present disclosure and FIG. 2 shows a film layer structure of the display panel along a BB direction. As shown in FIG. 1 and FIG. 2, in one embodiment, the display panel 100 may include a display region AA and a non-display region NA at least partially surrounding the display region AA.

The display panel 100 may further include: a first base plate 10 and a second base plate 20 opposite to each other, and first reflection structures 31 in the non-display region NA.

The first base plate 10 may include a first substrate 11, and the second base plate 20 may include a light-blocking layer 22. In the non-display region NA, the light-blocking layer 22 may include at least one first opening K1. Along a first direction D1, the at least one first opening K1 may penetrate through the light-blocking layer 22. The first direction D1 may be a thickness direction of the display panel 100. Along the first direction, a projection of one of the first reflection structures 31 may overlap with a projection of a corresponding one of the at least one first opening K 1.

For description purposes only, the embodiment in FIG. 1 where the display panel has a rectangular structure is used as an example to illustrate the present disclosure, and does not limit the scope of the present disclosure. In some other embodiments, the shape of the display panel may be a rounded rectangle, a circle, or any other irregular shape. Also, the embodiment in FIG. 2 with an exemplary film layer structure is used as an example to illustrate the present disclosure, and does not limit the number and thickness of the film layers in the display panel.

In one embodiment, the display panel may be a liquid crystal display panel. Correspondingly, the first base plate 10 may be an array substrate, and the second base plate 20 may be a color filter substrate. Liquid crystal may be filled between the first base plate 10 and the second base plate 20. The liquid crystal may be deflected by an electric field, thereby controlling the transmission of light. The second base plate 20 of the display panel 100 may include the light-blocking layer 22. The light-blocking layer 22 located in the display region AA may include a plurality of openings through which light can pass through, to realize a display function.

In a display panel in existing technologies, since a non-display region does not need to perform a display function and does not need to transmit light, the non-display region is covered by a light-blocking layer. Since a display region needs to perform a display function, a plurality of areas allowing light to pass through are provided. In a screen-off state, because of the difference in the coverage of the light-blocking layer between the display region and the non-display region, there is a large difference in reflectivity between the display region and the non-display region, and the color of the display region is lighter than that of the border area. An obvious color difference between the display region and the non-display region that can be distinguished by the human eye, is formed. That is, the black state effect of the two areas is inconsistent, thereby affecting the user experience.

As shown in FIG. 1 and FIG. 2, in the display panel 100 provided by the present disclosure, in the non-display region NA, the light-blocking layer 22 may include the plurality of first openings K1, and the first openings K1 may penetrate through the light-blocking layer 22 along the thickness direction of the light-blocking layer 22. In particular, the first reflection structures 31 may be also disposed in the non-display region NA. A position of one of the first reflection structures 31 may correspond to a position of a corresponding one of the plurality of first openings K1. That is, one of the first reflection structures 31 and a corresponding first opening K1 may overlap along the first direction D1. In the screen-off state, when external light irradiates the non-display region NA, the first reflection structures 31 in the non-display region NA may reflect at least part of the light, thereby increasing the reflectivity of the non-display region NA and reducing the difference in reflectivity between the non-display region NA and the display region AA in the screen-off state. The problem of large color difference between the display region AA and the non-display region NA when the screen is off may be alleviated, thereof improving the uniformity of the black state of the display panel in the scree-off state and the user experience.

Further, when the plurality of first openings K1 and the first reflection structures 31 are disposed in the non-display region NA, in the display status, the first reflection structures 31 may block the light inside the display product and prevent the display light from being emitted from the plurality of first openings K1 of the non-display region NA. Edge light leakage during the display process may be avoided, and the display effect of the display stage of the display panel may be ensured.

FIG. 2 only shows the film layer structure of a portion of the non-display region NA and a portion of the display region AA adjacent to the non-display region. The size of the plurality of openings in the non-display region NA and the display region AA penetrating through the light-blocking layer 22 is only used as an example to illustrate the present disclosure, and does not limit the scope of the present disclosure. Also, the embodiment shown in FIG. 2 only shows a position relationship of the first reflection structures 31 in the non-display region NA and the first reflection structures 31 on the second base plate 20, and is only used as an example to illustrate the present disclosure, and does not limit the scope of the present disclosure. In some other embodiments, the first reflection structures 31 may be disposed in the plurality of first openings K1, as shown in FIG. 3 which is another film layer structure of the display panel along the BB direction.

Figure 4:
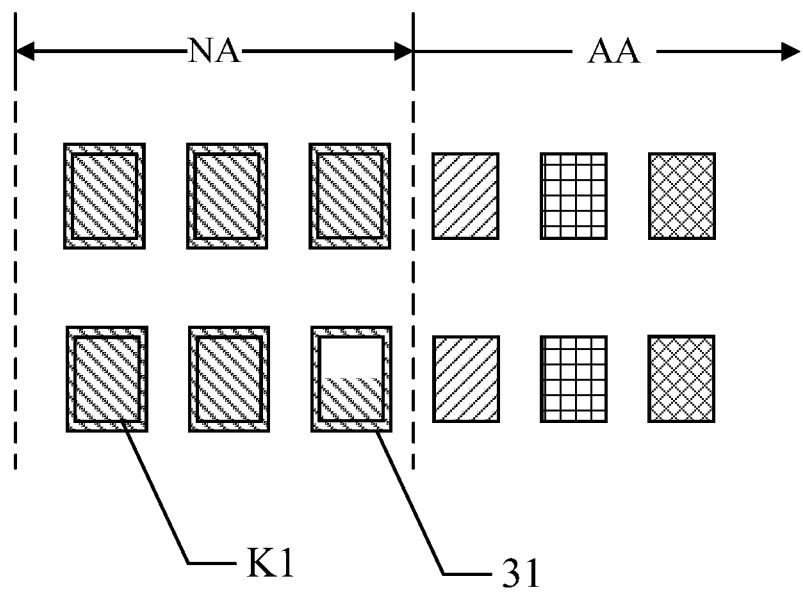
FIG. 4 illustrates a top view of a relative positional relationship of a first opening and a first reflection structure in a non-display region, consistent with various disclosed embodiments of the present disclosure.

FIG. 4 is a top view showing the relative positional relationship between the first reflection structures 31 and the plurality of first openings K1 in the non-display region NA. The embodiment shown in FIG. 4 where the first reflection structures 31 and the plurality of first openings K1 have rectangular structures is only used as an example to illustrate the present disclosure, and does not limit the scope of the present disclosure. In some other embodiments, the first reflection structures 31 and the plurality of first openings K1 may have other suitable shapes, and the top view of the first reflection structures 31 and the plurality of first openings K1 may be same or different. The present disclosure has no limit on this.

Figure 3:
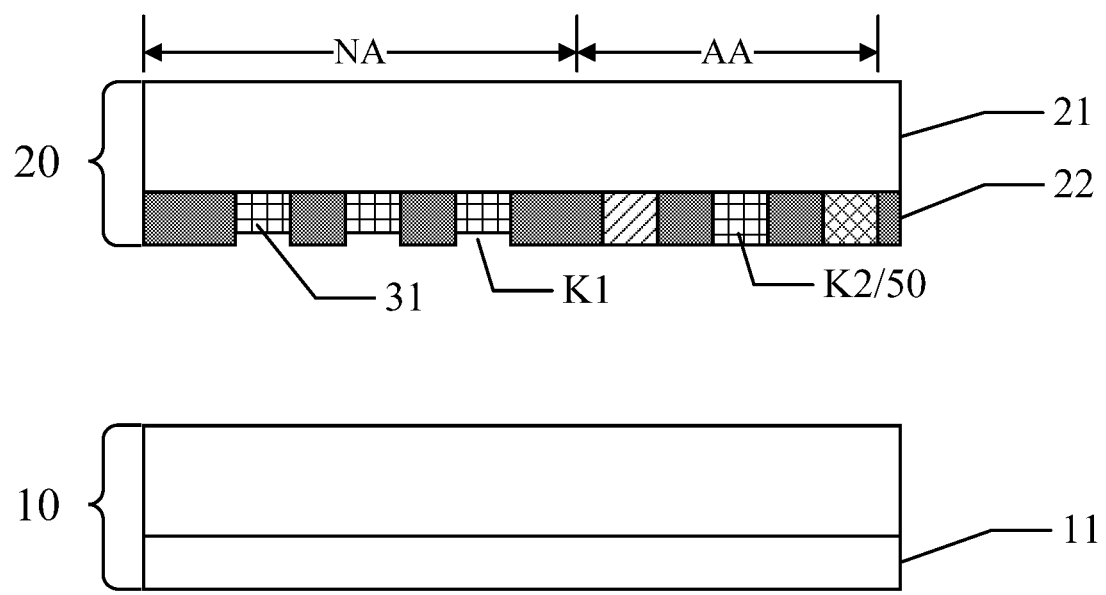
FIG. 3 illustrates another film layer structure of the display panel along a BB direction, consistent with various disclosed embodiments of the present disclosure.

As shown in FIG. 2 to FIG. 4, in one embodiment, along the first direction D1, a projection of one first reflection structure 31 may cover a projection of a corresponding first opening K1 of the plurality of first openings K1.

When the display panel provided by the present disclosure is applied to a liquid crystal display device, since the liquid crystal display panel itself does not emit light, a backlight module may be disposed at one side of the display panel, and the light provided by the backlight module may be used as the light required by the display device. required light. When the first reflection structure 31 does not completely cover the first opening K1, the light emitted by the backlight module may leak through a portion of the first opening not covered by the first reflection structure 31, resulting in light leakage of the display panel during the display stage and affecting the display effect. Therefore, in the present embodiment, the first opening K1 may be introduced into the non-display region NA and the first opening K1 may be completely covered by the first reflection structure 31. Therefore, in the display stage, when the light emitted by the backlight module is directed to the non-display region NA, the first reflection structure 31 may block light from exiting from the first opening K1, thereby avoiding light leakage when the first opening K1 is disposed in the non-display region NA and improving the display effect of the display panel.

Figure 5:
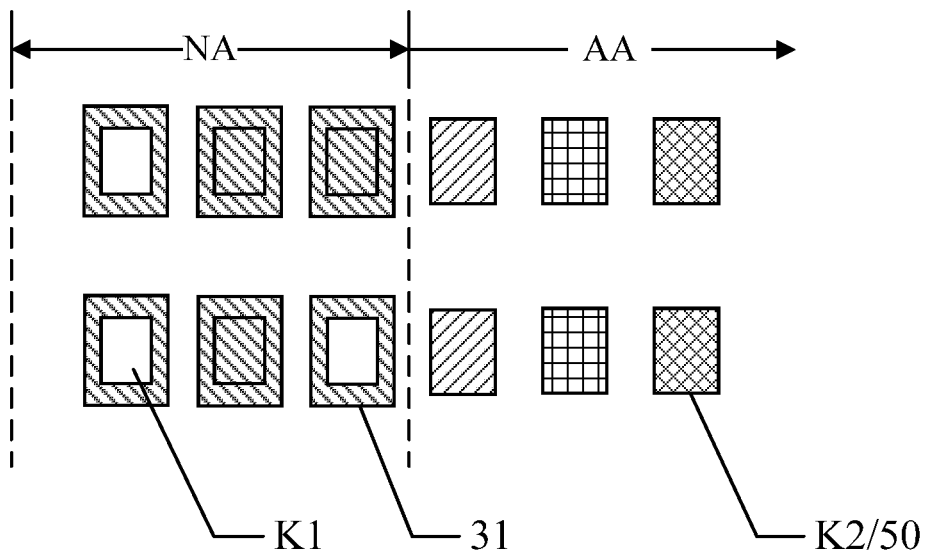
FIG. 5 illustrates an arrangement diagram of openings of a light-blocking layer in the display region and the non-display region, consistent with various disclosed embodiments of the present disclosure.

FIG. 5 is a schematic arrangement diagram of the plurality of openings of the light-blocking layer in the display region AA and the non-display region NA. It should be noted that this embodiment only shows the distribution of a portion of the plurality of openings of the light-blocking layer in the display region AA and the adjacent display region AA. This embodiment is used as an example only to illustrate the present disclosure, and does not limit the scope of the present disclosure.

As shown in FIG. 2 and FIG. 5, in one embodiment, the light-blocking layer 22 may include a plurality of second openings K2 located in the display region AA. And along the first direction D1, the plurality of second openings K2 may penetrate through the light-blocking layer 22. At least a portion of the plurality of first openings K1 may have an area smaller than the area of the plurality of second openings K2.

Specifically, in the display region AA, the light-blocking layer 22 may include the plurality of second openings K2. In one embodiment, the plurality of second openings K2 may be openings for accommodating color-resists 50. In the display stage, the light emitted by the backlight module may be able to emit light of the corresponding color when passing through the color-resists 50 of the plurality of second openings K2, thereby realizing the color display function of the display panel. Since the plurality of first openings K1 located in the non-display region NA and the plurality of second openings K2 located in the display region AA are both disposed on the light-blocking layer 22, in one embodiment, in the actual process, the plurality of first openings K1 and the plurality of second openings K2 may be formed in a same process, and there may be no need to increase the manufacturing process of the display panel due to the introduction of the plurality of first openings K1 in the non-display region NA. The manufacturing process of the display panel may be simplified, therefore improving manufacturing efficiency.

Since the plurality of second openings K2 is filled with the color-resists 50, when the plurality of first openings K1 is not filled with the color-resists 50, in the screen-off state, the material at the positions corresponding to the plurality of first openings K1 and the material at the positions corresponding to the plurality of second openings K2 may be different. Therefore, there may be a situation where the reflectivity at the positions corresponding to the plurality of first openings K1 is higher than the reflectivity at the positions corresponding to the plurality of second openings K2. Therefore, when the plurality of first openings K1 is introduced into the non-display region NA, the present embodiment may configure that at least a portion of the plurality of first openings K1 may have an area smaller than the area of the plurality of second openings K2. By appropriately reducing the area of the plurality of first openings K1, the large reflectivity of the non-display region NA caused by disposing the plurality of first openings K1 in the non-display region NA may be reduced to some extent. Therefore, the reflectivity difference between the display region AA and the non-display region NA may be balanced, and the overall black state uniformity of the display panel in the screen-off state may be improved.

Further, after the plurality of first openings K1 is introduced into the non-display region NA, when the area of the plurality of first openings K1 is larger, the risk of light leakage may be higher. Therefore, in the present embodiment, at least a portion of the plurality of first openings K1 in the non-display region NA may have an area smaller than the area of the plurality of second openings K2 in the display region AA. Therefore, while increasing the reflectivity of the non-display region NA, it may be also beneficial to avoid or reduce light leakage in the non-display region NA.

In one embodiment, the first reflection structures 31 may include metal materials.

The metal materials have a certain reflective effect, and the first reflection structure 31 may be set to include the metal materials. In the screen-off state, when the outside light irradiates the non-display region NA of the display panel, the metal materials in the non-display region NA may reflect the external light, to improve the reflectivity of the non-display region NA and reduce the reflectivity difference between the non-display region NA and the display region AA. The uniformity of the black state of the display panel in the screen-off state may be improved.

Figure 6:
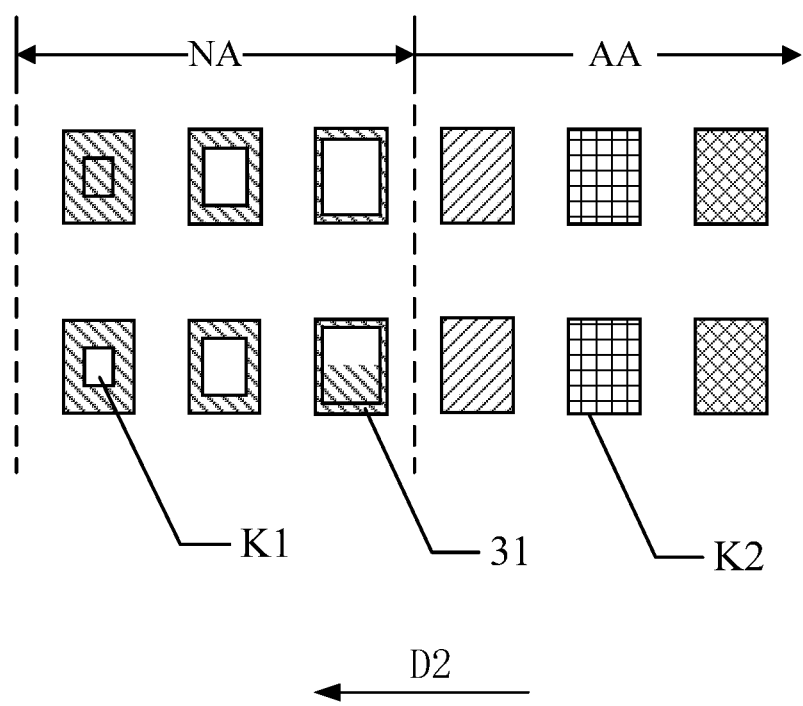
FIG. 6 illustrates another arrangement diagram of openings of a light-blocking layer in the display region and the non-display region, consistent with various disclosed embodiments of the present disclosure.

FIG. 6 shows another schematic diagram of the arrangement of the openings of the light-blocking layer in the display region AA and the non-display region NA. It should be noted that this embodiment only shows distribution of the openings of the light-blocking layer 22 in a portion of the display region NA and a portion of the adjacent non-display region NA and the changing trend of the plurality of first openings K1 in the non-display region NA. The embodiment is used as an example to illustrate the present disclosure, and does not represent the number and size of the openings actually included in the display panel.

As shown in FIG. 6, in one embodiment, the area of the plurality of first openings K1 may gradually decrease along the direction from the display region AA to the non-display region NA.

When the plurality of first openings K1 are introduced in the non-display region NA, the arrangement of the plurality of first openings K1 may refer to the arrangement of the plurality of second openings K2 in the display region AA. When the plurality of second openings K2 form a plurality of opening rows, the plurality of first openings K1 in the non-display region NA may also form a plurality of opening rows, and the plurality of opening rows in the non-display region NA may be located in the extending directions of the plurality of opening rows in the display region AA. As shown in FIG. 6, the direction from the display region AA to the non-display region NA may be understood as, in a same opening row, a direction D2 from one second opening K2 in the display region AA to one corresponding first opening K1 in the non-display region NA. For first openings K1 located in a same row, from the direction close to the display region AA to the direction away from the display region AA, the opening area may decrease gradually. Since the plurality of first reflection structures 31 covers the plurality of first openings K1 along the first direction D1, when the area of the plurality of first openings K1 is larger, the corresponding reflectivity may be higher. When the area of the plurality of first openings K1 is gradually reduced, the corresponding reflectivity may be also gradually reduced, such that the reflectivity of the display region AA and the non-display region NA is gradually reduced. Therefore, the black state in the screen-off state may also show a gradual change, which may improve the uniformity of the black state in the screen-off state.

Figure 7:
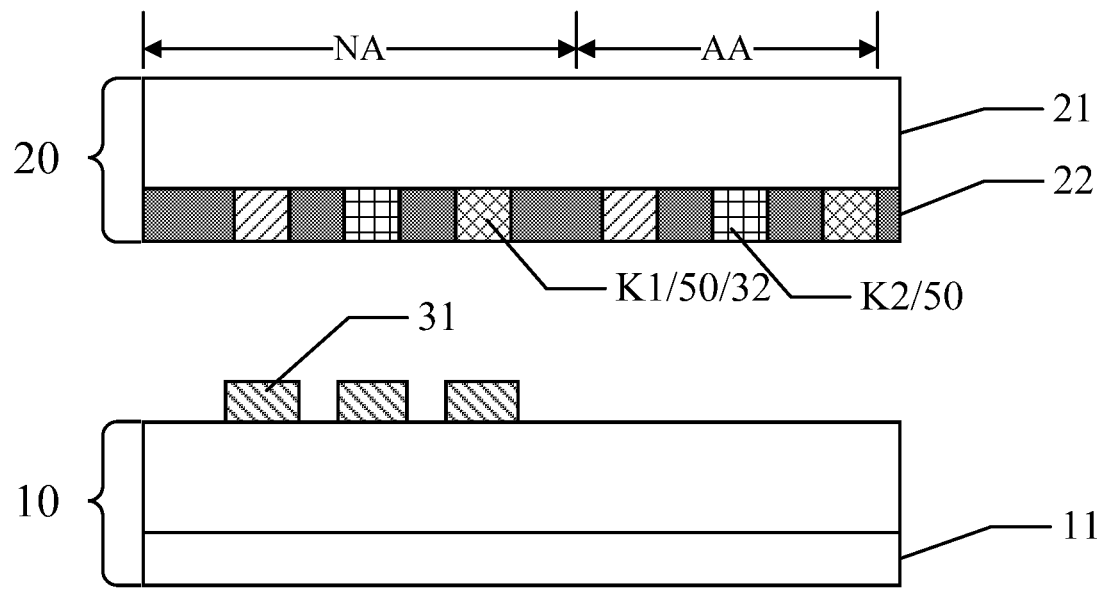
FIG. 7 illustrates another film layer structure of the display panel along a BB direction, consistent with various disclosed embodiments of the present disclosure.

FIG. 7 shows another film layer structure of the display panel along the BB direction. In one embodiment shown in FIG. 7, the plurality of first openings K1 may be filled with the color-resists 50.

As shown in FIG. 7, in one embodiment, the second base plate 20 may further include the color-resists 50, and at least a portion of the color-resists 50 may be disposed in the plurality of first openings K1. The display panel may further include second reflection structures 32. Along the first direction D1, a projection of one second reflection structure 32 may overlap a projection of a corresponding first opening K1 of the plurality of first openings K 1. The color-resists 50 may be multiplexed as the second reflection structures 32.

To realize the color display function of the display panel, the color-resists 50 may be usually filled in the plurality of second openings K2 in the display region AA. In one embodiment, the color-resists 50 filled in the plurality of second openings K2 may include red color-resists, green color-resists and blue color-resists. The structures including the color-resists 50 located in the plurality of second openings K2 in the display region AA may have a certain influence on the reflectivity of the display region AA and the color presented by the display panel in the screen-off state.

In this embodiment, the color-resists 50 may be also filled in the plurality of first openings K1 in the non-display region NA, and the color-resists 50 filled in the plurality of first openings K1 may be multiplexed as the second reflection structure 32. After the plurality of first openings K1 is introduced into the non-display region NA, the color-resists 50 corresponding to the positions of the plurality of first openings K1 and the first reflection structures 31 may both reflect the external light to a certain extent. Also, the type of material that plays a reflective role in the non-display region may be more similar to the type of materials that plays a reflective role in the display region AA. For example, the openings of the non-display region NA and the display region AA may be all provided with color-resists 50 that is able to play a reflective role. When the plurality of second openings K2 in the display region is filled with color-resists and the plurality of first openings K1 in the non-display region NA is not filled with color-resists, in the screen-off state, because of the difference in color-resists distribution, the color displayed in the display region AA and the non-display region NA of the display panel may have a color difference in the screen-off state. When the color-resists are filled in the plurality of first opening sK1 of the non-display region NA, on the one hand, this portion of the color-resists may compensate for the above-mentioned color difference, and on the other hand, it may also reduce the intensity of the light reflected by the first reflection structures 31 to prevent the intensity of the light reflected by the first reflection structures 31 from being too high. The light leakage in the non-display region NA and the corresponding problem of bright lines may be avoided. When the non-display region has light leakage and bright lines appear in the screen-off state, the visual difference of the display region and the non-display region may be aggravated, affecting the user's visual experience which is not beneficial to improve the uniformity of the black state in the screen-off state. Therefore, introducing the color-resists in the plurality of first openings K1 may be beneficial to further improve the uniformity of the black state of the product in the screen-off state.

As shown in FIG. 7, in one embodiment, along the first direction D1, the first reflection structures 31 may be located between the first substrate 11 and the color-resists 50.

Specifically, the embodiment of FIG. 7 shows a solution for disposing the first reflection structures 31 on the first base plate 10. Specifically, the first reflection structures 31 may be disposed on a side of the first base plate 10 facing the second base plate 20. In the screen-off state, when the external light is irradiated to the first reflection structures 31 through the plurality of first openings K1, the first reflection structures 31 may reflect the light. When the first reflection structures 31 are disposed between the color-resists 50 and the first substrate 11, the light reflected by the first reflection structures 31 may be emitted through the color-resists 50, and the color-resists 50 may filter the light reflected by the first reflection structures 31 to a certain extent, therefore improving the uniformity of the black state in the screen-off state. At the same time, it may be also beneficial to avoid the problem that the intensity of the light reflected by the first reflection structures 31 is too large which causes light leakage in the non-display region NA and the resulted bright lines.

Figure 8:
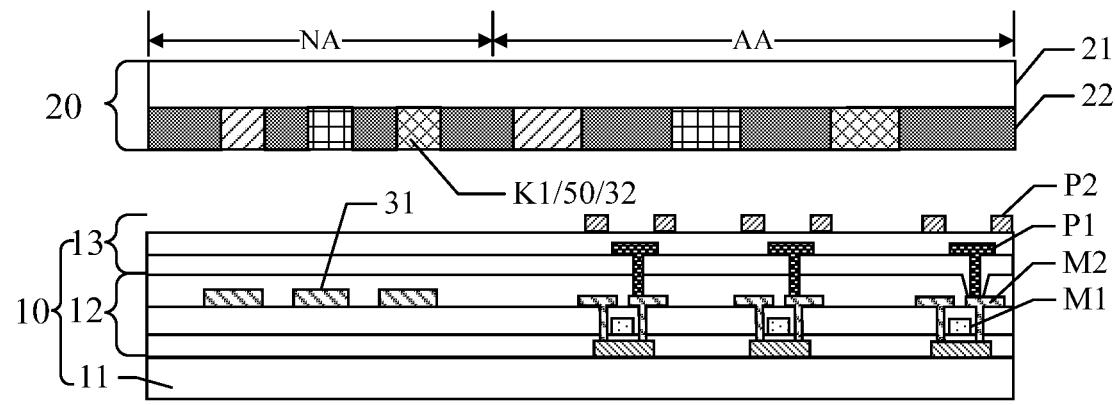
FIG. 8 illustrates another film layer structure of the display panel along a BB direction, consistent with various disclosed embodiments of the present disclosure.

FIG. 8 is a schematic diagram of another film layer structure of the display panel provided by another embodiment along the BB direction. In this embodiment, the film layer structure of the first base plate 10 in the display panel is refined. As shown in FIG. 88, in one embodiment, the first base plate 10 may include, in addition to the first substrate 11, a driving layer 12 and an electrode layer 13 disposed on a side of the first substrate 11 facing the second base plate 20. The driving layer 12 may at least include a first metal layer M1 and a second metal layer M2. The electrode layer 13 may include a first electrode layer P1 and a second electrode layer P2. The first reflection structures 31 in the non-display region NA may be formed in a same layer as at least one of the first metal layer M1, the second metal layer M2, the first electrode layer P1 and the second electrode layer P2 on the first base plate 10. The embodiment shown in FIG. 8 where the first reflection structures 31 and the second metal layer M2 are arranged in same layer is used as an example to illustrate the present disclosure. Therefore, it may not be necessary to introduce a separate film structure for the first reflection structures 31 in the display panel, and the existing film structures may be multiplexed. For example, when the second metal layer M2 is fabricated, the fabrication of the first reflection structures 31 may be completed at the same time. The overall fabrication process of the display panel may be simplified, improving the production efficiency.

In addition to disposing the first reflection structures 31 on the first base plate 10, in some other embodiments, the first reflection structures 31 may be also disposed on the second base plate 20. In another embodiment shown in FIG. 9 which is another film layer of the provided display panel along the BB direction, the first reflection structures 31 may be disposed at a side of the color-resists 50 in the second base plate 20 facing the first base plate 10. In the screen-off state, When the external light is irradiated to the first reflection structures 31 through the plurality of first openings K1, the first reflection structures 31 may also reflect the external light, to improve the reflectivity of the non-display region NA and reduce the reflectivity difference between the non-display region NA and the display region AA. Further, when the first reflection structures 31 are disposed on the surfaces of the color-resists 50 facing the first base plate 10, in the display stage, when the light emitted by the backlight module is directed to the non-display region NA, the first reflection structures 31 may completely block the path of light emitted to the plurality of first openings K1, such that the phenomenon of light leakage in the display stage may be avoided when the plurality of first openings K1 is introduced into the non-display region NA.

Figure 9:
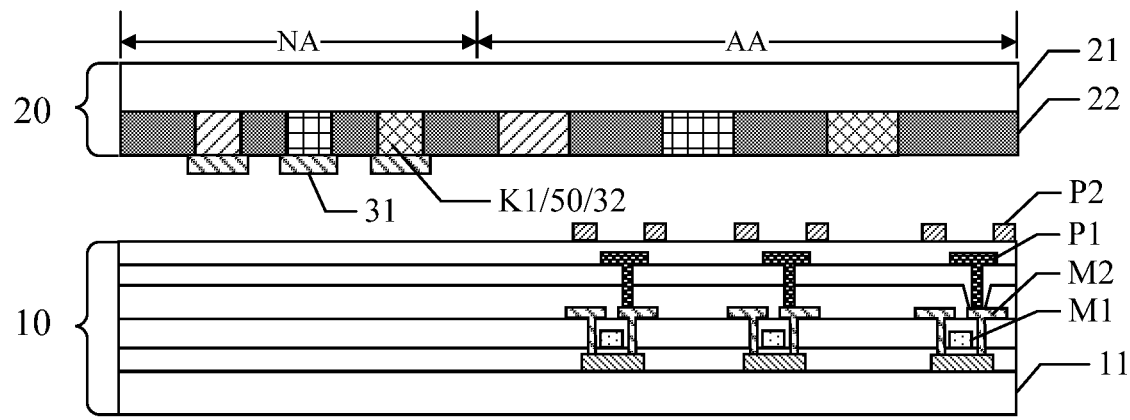
FIG. 9 illustrates another film layer structure of the display panel along a BB direction, consistent with various disclosed embodiments of the present disclosure.
Figure 10:
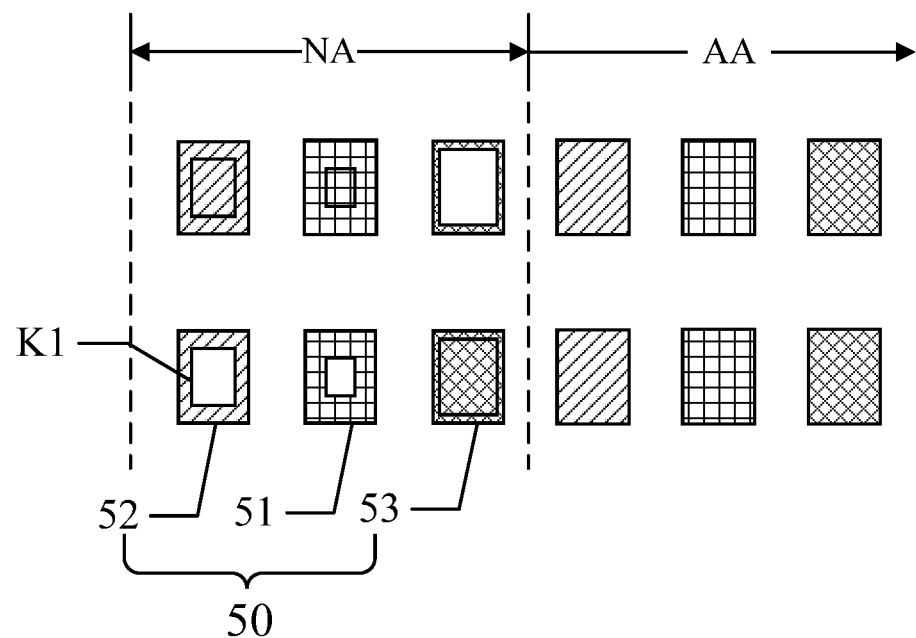
FIG. 10 illustrates another arrangement diagram of openings of a light-blocking layer in the display region and the non-display region, consistent with various disclosed embodiments of the present disclosure.

FIG. 10 shows another schematic diagram of the arrangement of the openings of the light-blocking layer in the display region AA and the non-display region NA. This embodiment shows a solution in which both the plurality of first openings K1 and the plurality of second openings K2 are filled with the color-resists 50. As shown in FIG. 8 to FIG. 10, in one embodiment, the color-resists 50 may include first color-resists 51 and second color-resists 52. The transmittance of the first color-resists 51 per unit area may be larger than the transmittance of the second color-resists 52 with the same unit area. In the non-display region NA, the area of one of the plurality of first openings K1 corresponding to the first color-resists 51 may be S1, and the area of one of the plurality of first openings K1 corresponding to the second color-resists 52 may be S2, where S1<S2.

As shown in FIG. 8 to FIG. 10, in the non-display region NA, the first reflection structures 31 may be located on the side of the color-resists 50 facing the first substrate 11 in the first base plate 10. In the screen-off state, when the external light shines into the non-display region NA, the light may first pass through the color-resists 50, and the color-resists 50 may have light transmittance. The light passing through the color-resists 50 may be reflected by the first reflection structures 31 and then exit through the color-resists 50. Within a unit area, the transmittance of the color-resists 50 may be different, and the amount of light passing through the color-resists 50 to the first reflection structures 31 may also be different. Therefore, the amount of the light emitted through the color-resists 50 after being reflected by the first reflection structures 31 may also be different. When the transmittance of the color-resists is larger, the amount of light passing through the color-resists 50 to the first reflection structures 31 may be larger, the amount of the light emitted through the color-resists 50 after being reflected by the first reflection structures 31 may also be larger and the reflectivity may be larger. The color-resists 50 of different colors may have differences in their transmittance. When the transmittance of the first color-resists 51 per unit area is larger than the transmittance of the second color-resists 52 of the same unit area, the reflectivity per unit area of the region corresponding to the first color-resists 51 may be higher than the reflectivity of the region corresponding to the second color-resists 52 of the same unit area. Therefore, in this embodiment, the area of the first openings K1 corresponding to the first color-resists 51 may be set to be smaller than the area of the first openings K1 corresponding to the second color-resists 52. This may be equivalent to reducing the area of the first color-resists 51 that are able actually to transmit the light. Therefore, the transmittance difference of the region where the first color-resists 51 and the second color-resists 52 are located may be reduced, to reduce the reflectivity difference of the region where the first color-resists 51 and the second color-resists 52 are located. The reflectivity uniformity of the non-display region NA may be improved, improving the black state uniformity of the non-display region NA and the display region AA.

As shown in FIG. 10, the color-resists 50 may further include third color-resists 53, and the transmittance of the third color-resists 53 per unit area may be lower than the transmittance of the second color-resists 52 of the same unit area. In the non-display region NA, the area of the first openings K1 corresponding to the third color-resists 53 may be S3, where S2<S3.

Specifically, when the transmittance of the third color-resists 53 of the same unit area is smaller than the transmittance of the second color-resists 52 of the same unit area, the reflectivity of the region corresponding to the third color-resists 53 of the same unit area may be smaller than the reflectivity of the region corresponding to the second color-resists 52 of the same unit area. Therefore, in the non-display region NA, the area of the first openings K1 corresponding to the third color-resists 53 may be set to be larger than the area of the first openings K1 corresponding to the second color-resists in this embodiment. That is, the area of the third color-resists 53 that is able to actually transmit light may be increased, to reduce the reflectivity difference of the third color-resists 52 and the second color-resists 52 and balance the reflectivity difference of different areas in the non-display region NA.

In one embodiment, as shown in FIG. 10, when the transmittance of the first color-resists 51 per unit area is larger than the transmittance of the second color-resists 52 per unit area, and the transmittance of the third color-resists 53 per unit area is smaller than the transmittance of the second color-resists 52, the area of the first opening K1 corresponding to the first color-resists 51, the second color-resists 52 and the third color-resists 53 in the non-display region NA may be set to meet S1<S2<S3. The difference in reflectivity of different color-resists 50 in the non-display region NA may be balanced by the differentiated design of the area of the first openings K1. Therefore, the reflectivity uniformity at different positions in the non-display region NA may be improved, improving the uniformity of the black state of the display panel in the screen-off state.

In one embodiment, the first color-resists 51 may be green color-resists, the second color-resists 52 may be red color-resists, and the third color-resists 53 may be blue color-resists.

For the green color-resists, red color-resists and blue color-resists of the same unit area, the transmittance of the green color-resists may be the highest, the transmittance of the red color-resists may be in the middle, and the transmittance of the blue color-resists may be the lowest. Correspondingly, the area of the first openings K1 corresponding to the green color-resists may be set to be the smallest, the area of the first openings K1 corresponding to the red color-resists may be set in the middle, and the area of the first openings K1 corresponding to the blue color-resists may be set to be the largest. The reflectivity difference because of the transmittance difference of the different color-resists may be balanced, improving the reflectivity difference in the non-display region NA.

In one embodiment, when the plurality of first openings K1 in the non-display region NA is filled with the first color-resists 51, the second color-resists 52 and the third color-resists 53, the first color-resists 51 in the non-display region NA may be formed in a same process as the first color-resists 51 in the display region AA, the second color-resists 52 in the non-display region NA may be formed in a same process as the second color-resists 52 in the display region AA, and the third color-resists 53 in the non-display region NA may be formed in a same process as the third color-resists 53 in the display region AA. Therefore, when the color-resists 50 are introduced into the plurality of first openings K1 in the non-display region NA, no new fabrication process may be added.

Figure 11:
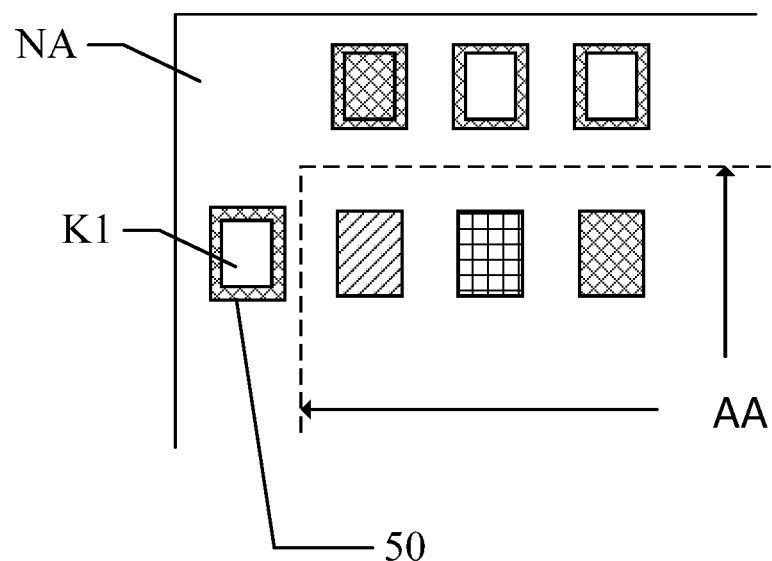
FIG. 11 illustrates another arrangement diagram of openings of a light-blocking layer in the display region and the non-display region, consistent with various disclosed embodiments of the present disclosure.

FIG. 11 is a schematic diagram showing another arrangement of the openings of the light-blocking layer in the display region AA and the non-display region NA. This embodiment shows another manner of filling the color-resists 50 in the plurality of first openings K1 in the non-display region NA.

As shown in FIG. 11, in another embodiment, the color-resists 50 located in the plurality of first openings K1 may be all blue color-resists.

Specifically, in the present embodiment, when the color-resists 50 are filled in the plurality of first openings K1 in the non-display region NA, the color-resists 50 filled in the plurality of first openings K1 may be all blue color-resists. This design method may be especially suitable for the display panel with a narrow frame structure. For example, the width of the non-display region NA of the display panel is small, and only one column or row of first openings K1 may be able to be set. Since human eyes are more sensitive to green and red, when the plurality of first openings K1 is filled with green color-resists or all red color-resists, the frame region of the display panel may appear green or red, which affects the display effect or black state uniformity. For this reason, in the present embodiment, the color-resists 50 filled in the plurality of first openings K1 may be all blue color-resists. The uniformity of the black state of the display panel in the screen-off state may be improved, and also the frame region of the display region AA may be prevented from appearing red or green.

Figure 12:
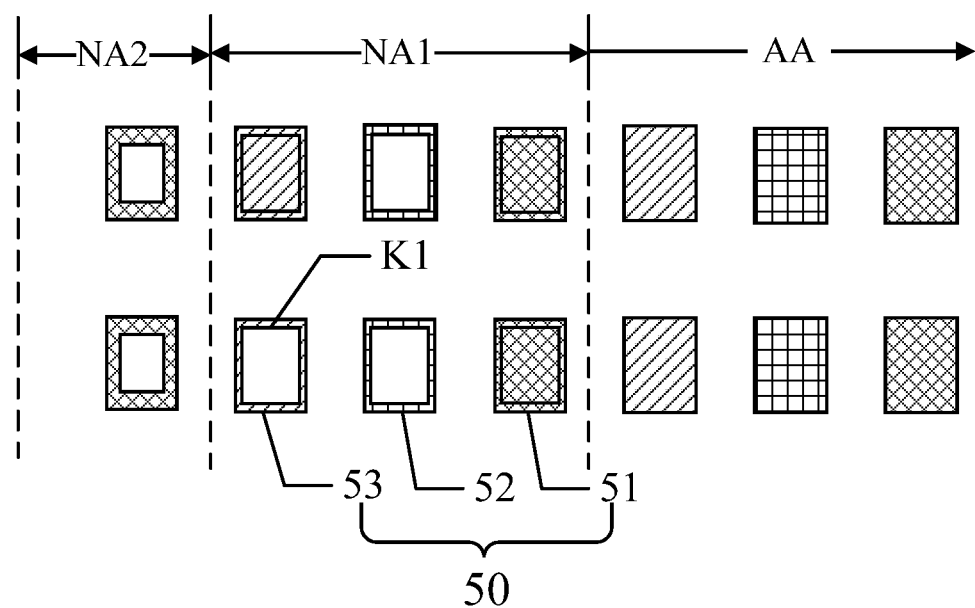
FIG. 12 illustrates another arrangement diagram of openings of a light-blocking layer in the display region and the non-display region, consistent with various disclosed embodiments of the present disclosure.

FIG. 12 shows another schematic diagram of the arrangement of the openings of the light-blocking layer in the display region AA and the non-display region NA. This embodiment shows a solution in which the plurality of first openings K1 is filled with the color-resists 50.

As shown in FIG. 12, in one embodiment, the color-resists 50 may include first color-resists 51 and second color-resists 52. The transmittance of the first color-resists 51 per unit area may be larger than the transmittance of the second color-resists 52 with the same unit area. In the non-display region NA, the area of the first openings K1 corresponding to the first color-resists 51 and the area of the first openings K1 corresponding to the second color-resists 52 may be same. The first color-resists 51 may be disposed between the second color-resists 52 and the display region AA.

As shown in FIG. 8, FIG. 9 and FIG. 12, in the non-display region NA, the first reflection structures 31 may be located on the side of the color-resists 50 facing the first substrate 11 in the first base plate 10. In the screen-off state, when the external light shines into the non-display region NA, the light may first pass through the color-resists 50, and the color-resists 50 may have light transmittance. The light passing through the color-resists 50 may be reflected by the first reflection structures 31 and then exit through the color-resists 50. Within a unit area, the transmittance of the color-resists 50 may be different, and the amount of light passing through the color-resists 50 to the first reflection structures 31 may also be different. Therefore, the amount of the light emitted through the color-resists 50 after being reflected by the first reflection structures 31 may also be different. When the transmittance of the color-resists is larger, the amount of light passing through the color-resists 50 to the first reflection structures 31 may be larger, the amount of the light emitted through the color-resists 50 after being reflected by the first reflection structures 31 may also be larger and the reflectivity may be larger. The color-resists 50 of different colors may have differences in their transmittance. When the transmittance of the first color-resists 51 per unit area is larger than the transmittance of the second color-resists 52 of the same unit area, the reflectivity per unit area of the region corresponding to the first color-resists 51 may be higher than the reflectivity of the region corresponding to the second color-resists 52 of the same unit area. Therefore, when the area of the first openings K1 corresponding to the first color-resists 51 and the area of the first openings K1 corresponding to the second color-resists 52 are same, the reflectivity per unit area of the region of the first openings K1 corresponding to the first color-resists 51 may be larger than the reflectivity per unit area of the region of the first openings K1 corresponding to the second color-resists 52. At this time, as shown in FIG. 12, the first color-resists 51 and the first openings K1 corresponding to the first color-resists 51 may be disposed between the first openings K1 corresponding to the second color-resists 52 and the display region AA. Correspondingly, the reflectivity from the display region AA, the region of the first openings K1 corresponding to the first color-resists 51, to the region of the first openings K1 corresponding to the second color-resists 52, the reflectivity may gradually decrease. The black state uniformity of the display panel in the screen-off state may be improved.

Figure 13:
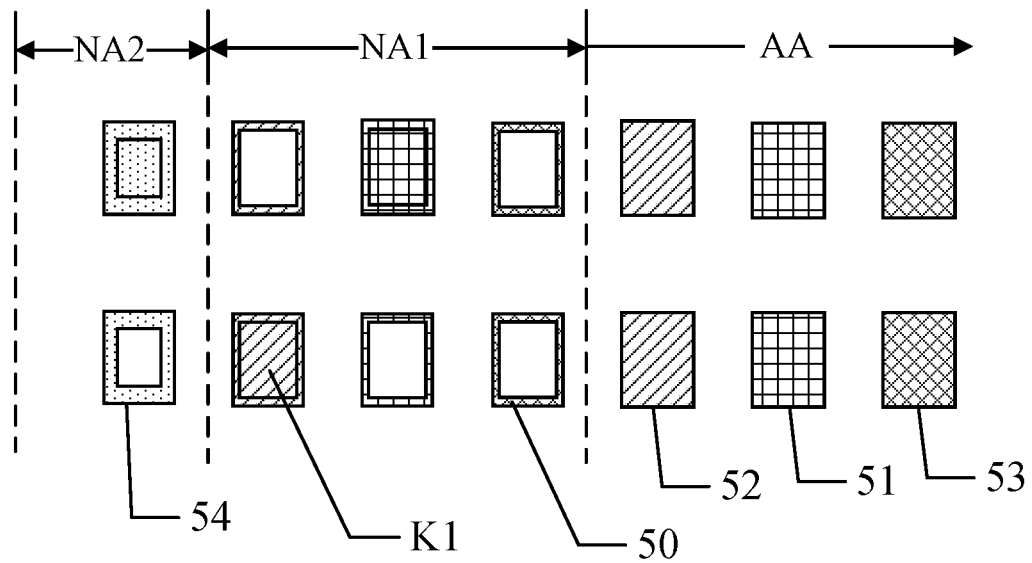
FIG. 13 illustrates another arrangement diagram of openings of a light-blocking layer in the display region and the non-display region, consistent with various disclosed embodiments of the present disclosure.

FIG. 13 shows another schematic diagram of the arrangement of the openings of the light-blocking layer in the display region AA and the non-display region NA. In this embodiment, the non-display region NA may include a first non-display region NA1 and a second non-display region NA2.

As shown in FIG. 13, in one embodiment, the non-display region NA may include a first non-display region NA1 and a second non-display region NA2. The first non-display region NA1 may be located between the second non-display region NA2 and the display region AA. The area of the first openings K1 in the first non-display region NA1 may be larger than the area of the first openings K1 in the second non-display region NA2.

Specifically, in the present embodiment, the non-display region NA may be divided into the first non-display region NA1 arranged close to the display region AA and the second non-display region NA2 arranged away from the display region AA. The size of the first openings K1 arranged in the first non-display region NA1 may be larger than the size of the first openings K1 set in the second non-display region NA2. In the non-display region NA, when the size of the first openings K1 is larger, the reflectivity of the corresponding area may be larger. In this embodiment, the size of the first openings K1 in the first non-display region NA1 close to the display region AA may be set larger, and the size of the first openings K1 in the second non-display region NA2 away from the display region AA may be set larger is smaller. Correspondingly, from the display region AA to the first non-display region NA1, and then to the second non-display region NA2, the reflectivity may gradually decrease, and the uniformity of the black state of the display panel in the screen-off state may be improved.

In one embodiment, the size of the first openings K1 located in the first non-display region NA1 may be set to be the same, and the size of the first openings K1 located in the second non-display region NA2 may also be set to be the same. Of course, in some other embodiment, along the direction from the first non-display region NA1 to the second non-display region NA2, the area of the first openings K1 located in the first non-display region NA1 may gradually decrease, and the area of the first openings K1 in the second non-display region NA2 may also gradually decrease.

For description purposes only, the embodiment shown in FIG. 13 which is an arrangement of the plurality of first openings K1 in the first non-display region NA1 and the second non-display region NA2 is used as an example to illustrate the present disclosure, and does not limit the scope of the present disclosure. The number, size and shape of the plurality of first openings K1 in the first non-display region NA1 and the second non-display region NA2 are not limited in the present disclosure.

Figure 14:
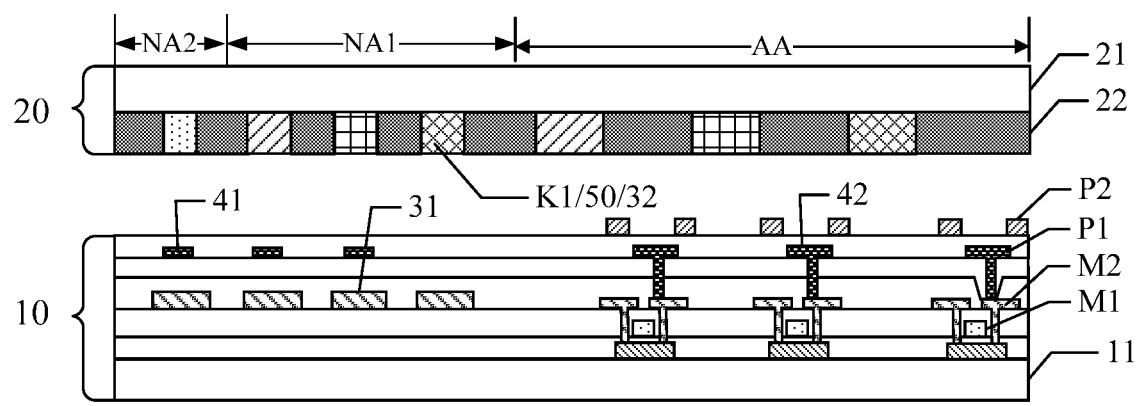
FIG. 14 illustrates another film layer structure of the display panel along a BB direction, consistent with various disclosed embodiments of the present disclosure.

FIG. 14 shows another schematic diagram of the arrangement of the openings of the light-blocking layer in the display region AA and the non-display region NA. In this embodiment, the non-display region NA may include a first non-display region NA1 and a second non-display region NA2.

As shown in FIG. 13 and FIG. 14, in another embodiment, the second base plate 20 may include the color-resists 50. At least a portion of the color-resists 50 may be disposed in the plurality of first openings K1. The color-resists 50 may include red color-resists, green color-resists and blue color-resists. The color-resists 50 may further include white color-resists 54. In another embodiment, at least a portion of the plurality of first openings K1 may be filled with highly transparent film layer. The portion of the plurality of first openings K1 provided with the white color-resists 54 or the highly transparent film layer may be located in the second non-display region NA2.

Specifically, when the non-display region NA includes the first non-display region NA1 located close to the display region AA and the second non-display region NA2 located away from the display region AA, in one embodiment, the area of the first openings K1 in the first non-display region NA1 may be larger than the area of the first openings K1 in the second non-display region NA2. The first openings K1 in the first non-display region NA1 may be filled with red color-resists, green color-resists or blue color-resists, such that the reflectivity of the area where the corresponding first openings K1 in the non-display region NA1 is located may be closer to the reflectivity of the display region AA. Further, since the area of the first openings K1 in the second non-display region NA2 is small, when the first openings K1 of the non-display region NA2 is filled with white color-resists 54 or the film layer with high transmittance, the reflectivity of the area corresponding to the first openings K1 with the smaller area may be increased, thereby reducing the reflectivity difference corresponding to the first non-display region NA1 and the second non-display region NA2. The uniformity of the reflectivity of the first non-display region NA1 and the second non-display region NA2 may be improved, to improve the uniformity of the black state of the display panel in the screen-off state. In one embodiment, the film layer with high transmittance may be a transparent colloid such as OC glue.

For description purposes only, the embodiment shown in FIG. 14 with the plurality of first openings K1 in the first non-display region NA1 and the second non-display region NA2 is used as an example to illustrate the present disclosure, and does not limit the scope of the present disclosure. In various embodiments, the number, size and shape of the plurality of first openings K1 in the first non-display region NA1 and the second non-display region NA2 are not limited in the present disclosure.

Figure 15:
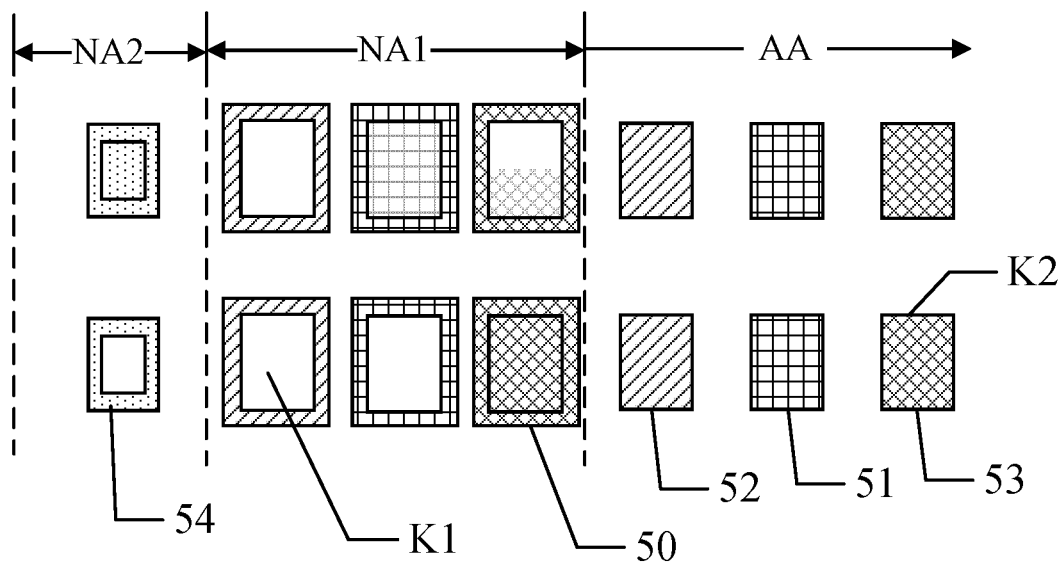
FIG. 15 illustrates another arrangement diagram of openings of a light-blocking layer in the display region and the non-display region, consistent with various disclosed embodiments of the present disclosure.

FIG. 15 shows another schematic diagram of the arrangement of the openings of the light-blocking layer in the display region AA and the non-display region NA. In this embodiment, the non-display region NA may include a first non-display region NA1 and a second non-display region NA2.

As shown in FIG. 15, in one embodiment, the light-blocking layer 22 may further include second openings K2 in the display region AA. The area of the first openings K1 I the first non-display region NA1 may be same as the area of the second openings K2 in the display region AA.

Specifically, when the non-display region NA includes the first non-display region NA1 located close to the display region AA and the second non-display region NA2 located away from the display region AA, in the present embodiment, the area of the first openings K1 in the first non-display region NA1 may be set to equal the area of the second openings K2 in the display region AA, such that the reflectivity of the first non-display region NA1 adjacent to the display region AA may be closer to the reflectivity of the display region AA. In some embodiments, the color-resists 50 filled in the first openings K1 in the first non-display region NA1 may be the same as the color-resists 50 filled in the second openings K2 in the display region AA. When the color-resists 50 filled in the second openings K2 in the display region AA includes the red color-resists 50, the green color-resists 50 or the blue color-resists, the color-resists 50 filled in the first openings K1 in the first non-display region NA1 may also include the red color-resists, the green color-resists or the blue color-resists. Correspondingly, the reflective material corresponding to the positions of the first openings K1 in the first non-display region NA1 may be closer to the reflective material corresponding to the positions of the second openings K2 in the display region AA. The difference in reflectivity between first non-display region NA1 and the display region AA may be reduced, improving the uniformity of the black state of the display panel in the screen-off state.

For description purposes only, the embodiment shown in FIG. 15 with the plurality of first openings K1 in the first non-display region NA1 and the second non-display region NA2 is used as an example to illustrate the present disclosure, and does not limit the scope of the present disclosure. In various embodiments, the number, size and shape of the plurality of first openings K1 in the first non-display region NA1 and the second non-display region NA2 are not limited in the present disclosure.

Figure 16:
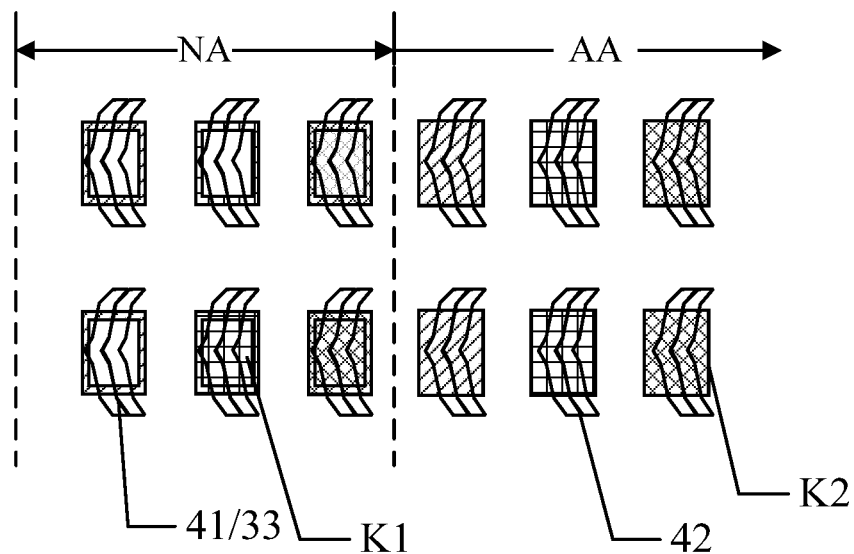
FIG. 16 illustrates another arrangement diagram of openings of a light-blocking layer in the display region and the non-display region, consistent with various disclosed embodiments of the present disclosure.

FIG. 16 shows another schematic diagram of the arrangement of the openings of the light-blocking layer in the display region AA and the non-display region NA. In this embodiment, first pixel electrodes 41 may be disposed I the non-display region NA.

In one embodiment, the display panel may further include first pixel electrodes 41 and second pixel electrodes 42. The first pixel electrodes 41 may be disposed in the non-display region NA, and the second pixel electrodes 42 may be disposed in the display region AA. The display panel may further include third reflection structures 33. Along the first direction D1, a projection of one third reflection structure 33 may overlap a projection of a corresponding first opening K1. The first pixel electrodes 41 may be multiplexed as the third reflection structures 33.

In the display region AA, each second opening K2 may be correspondingly provided with a pixel electrode. In one embodiment, the display panel may further include a common electrode. For liquid crystal display products, in the display stage, voltages are respectively provided to the pixel electrodes and the common electrode. The pixel electrodes and the common electrode may generate an electric field that drives the liquid crystal to deflect. After being deflected by the liquid crystal, the light may be able to be emitted to the light emitting surface of the display panel through the second openings K2, thereby realizing the display function. Since the material of the pixel electrodes also has a certain reflectivity, in the screen-off state, the second pixel electrodes 42 in the display region AA may also play a certain reflective function, affecting the reflectivity of the display region AA. As shown in FIG. 14 and FIG. 16, to further reduce the reflectivity difference between the display region AA and the non-display region NA, when the plurality of first opening K1 is disposed the non-display region NA, the first pixel electrodes 41 may also be disposed in the non-display region NA. Along the first direction D1, the first pixel electrodes 41 may overlap with the plurality of first openings K1. Therefore, the first pixel electrodes 41 may be multiplexed as the third reflection structures 33 of the display panel. In the screen-off state of the display panel, the first pixel electrodes 41 overlapping with the plurality of first openings K1 may be able to play a reflective function. Correspondingly, the types of reflective materials corresponding to the opening positions in the non-display region NA and the display region AA may be more consistent, and the reflection effect on the light may be also more consistent, improving the uniformity of the black state of the display region AA and the non-display region NA of the display panel in the screen-off state.

As shown in FIG. 16, in one embodiment, the light-blocking layer 22 may further include the second openings K2 located in the display region AA. Along the first direction D1, the second pixel electrodes 42 may overlap with the second openings K2. An overlapping area of one first pixel electrode 41 and a corresponding first opening K1 may be S01. An overlapping area of one second pixel electrode 42 and a corresponding second opening K2 may be S02. The area of the second opening K2 may be S00, where S01/S0>S02/S00.

When one pixel electrode overlaps with one corresponding opening, if the proportion of the pixel electrode in the opening is larger, the reflection effect of the pixel electrode on light may be better and the reflectivity may be higher. When the proportion of the first pixel electrodes 41 of the non-display region NA in the first openings K1 is set to be larger than the proportion of the second pixel electrodes 42 in the second openings K2 of the display region AA, the reflectivity of the non-display region NA in the screen-off state may be improved, and the reflectivity difference between the non-display region NA and the display region AA may be reduced, improving the uniformity of the black state of the display region AA and the non-display region NA of the display panel in the screen-off state.

Figure 17:
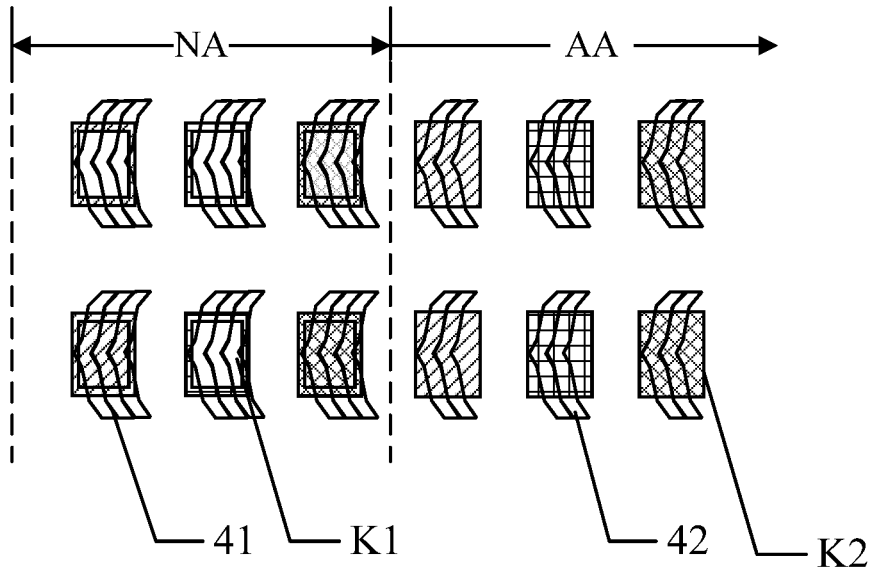
FIG. 17 illustrates another arrangement diagram of openings of a light-blocking layer in the display region and the non-display region, consistent with various disclosed embodiments of the present disclosure.

FIG. 17 shows another schematic diagram of the arrangement of the openings of the light-blocking layer in the display region AA and the non-display region NA. In this embodiment, first pixel electrodes 41 may be disposed in the non-display region NA and the second pixel electrodes 42 may be disposed in the display region AA.

As shown in FIG. 17, in one embodiment, the first pixel electrodes 41 may include N1 electrode strips, and the second pixel electrodes 42 may include N2 electrode strips, where $N1 > N2 \geq 2$.

In the embodiment shown in FIG. 17, the number of electrode strips included in the first pixel electrodes 41 located in the non-display region NA may be different from the number of the electrode strips contained in the second pixel electrodes 42 located in the display region AA. Specifically, the number of electrode strips included in the first pixel electrodes 41 located in the non-display region NA may be larger than the number of the electrode strips contained in the second pixel electrodes 42 located in the display region AA. The embodiment shown in FIG. 17 where the first pixel electrodes 41 include three electrode strips and the second pixel electrodes 42 include two electrode strips is used as an example for illustration, and does not limit the number of electrode strips actually included in the first pixel electrodes 41 and the second pixel electrodes 42.

In the embodiment shown in FIG. 14 and FIG. 17, the number of electrode strips included in the first pixel electrodes 41 located in the non-display region NA may be larger than the number of the electrode strips contained in the second pixel electrodes 42 located in the display region AA. In one embodiment, the number of electrode strips overlapping the first openings K1 along the first direction D1 may be larger than the number of electrode strips overlapping the second openings K2, such that the proportion of the first pixel electrodes P1 in the first openings K1 may be larger than the proportion of the second pixel electrodes P2 in the second openings K2. The reflectivity of the non-display region NA in the screen-off state may be improved, and the reflectivity difference between the non-display region NA and the display region AA may be reduced, improving the uniformity of the black state of the display region AA and the non-display region NA of the display panel in the screen-off state.

Figure 18:
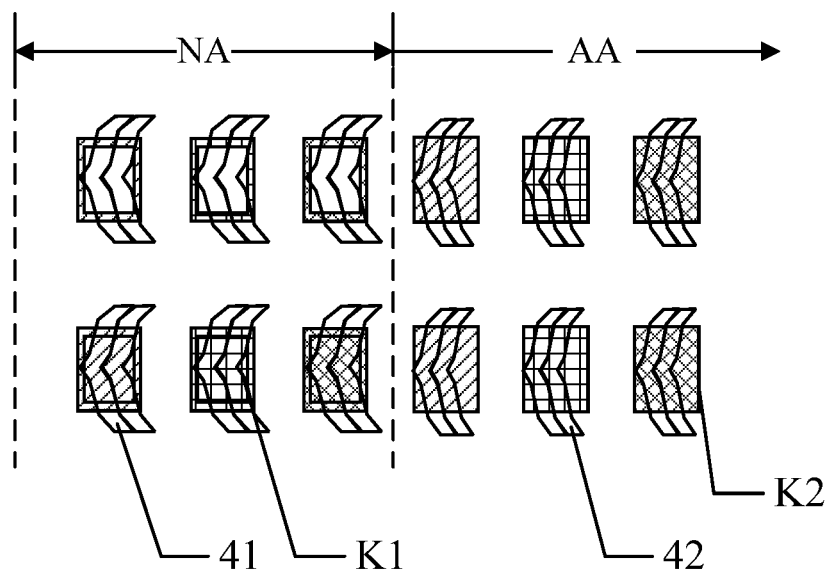
FIG. 18 illustrates another arrangement diagram of openings of a light-blocking layer in the display region and the non-display region, consistent with various disclosed embodiments of the present disclosure.

FIG. 18 shows another schematic diagram of the arrangement of the openings of the light-blocking layer in the display region AA and the non-display region NA. In this embodiment, first pixel electrodes 41 may be disposed in the non-display region NA and the second pixel electrodes 42 may be disposed in the display region AA.

As shown in FIG. 18, in one embodiment, the first pixel electrodes 41 may include at least one first electrode strip, and the second pixel electrodes 42 may include at least one second electrode strip. A width of the at least one first electrode strip may be larger than a width of the at least one second electrode strip.

When the first pixel electrodes 41 corresponding to the first openings K1 include at least one first electrode strip and the second pixel electrodes 42 corresponding to the second opening include at least one second electrode strip, the number of the at least one first electrode strip overlapping the first openings K1 may be same as the number of the at least one second electrode strip overlapping the second openings K2. In the present embodiment, the width of the at least one first electrode strip may be set to be larger than the width of the at least one second electrode strip. Correspondingly, the proportion of the first pixel electrodes P1 overlapping the first openings K1 in the first openings K1 may be larger than the proportion of the second pixel electrodes P2 overlapping the second openings K2 in the second openings K2. The reflectivity of the non-display region NA in the screen-off state may be improved, and the reflectivity difference between the non-display region NA and the display region AA may be reduced, improving the uniformity of the black state of the display region AA and the non-display region NA of the display panel in the screen-off state.

The above embodiments where the first openings K1 and the first reflection structures 31 have a one-to-one correspondence are used as examples to illustrate the present disclosure, and do not limit the scopes of the present disclosure. In some other embodiments, one first reflection structure 31 may correspond to at least two first openings K1 at the same time. For example, in one embodiment shown in FIG. 19 which is another film layer structure of the display panel along the BB direction, when some first openings K1 correspond to a same first reflection structure 31, the number of the first reflection structures 31 in the display panel may be reduced and the fabrication difficulty of the first reflection structures 31 may be reduced.

Figure 20:
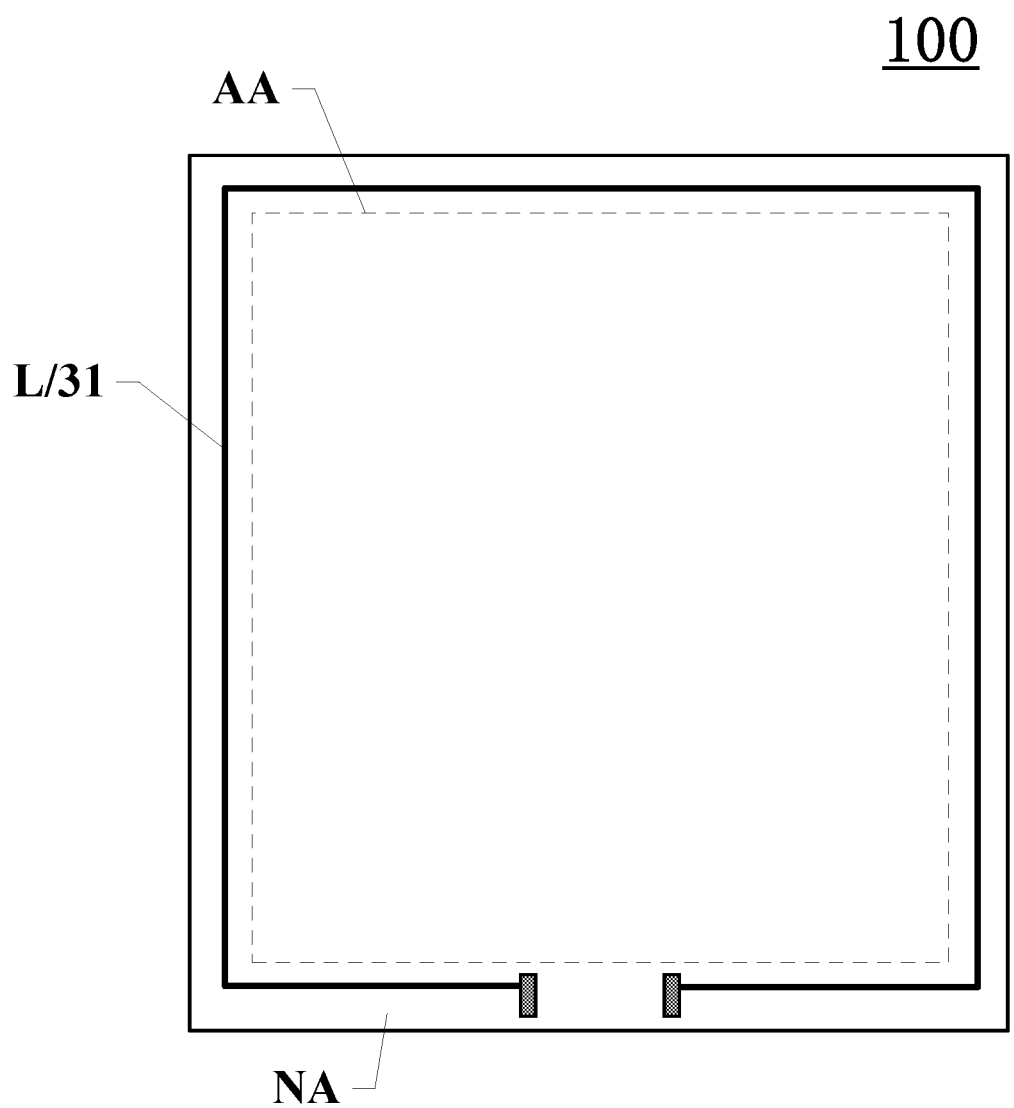
FIG. 20 illustrates another exemplary display panel consistent with various disclosed embodiments of the present disclosure.

FIG. 20 shows another structure of the display panel provided by another embodiment of the present disclosure. In the present disclosure, electrostatic transmission lines L may be disposed in the display panel. In one embodiment, the display panel may further include the electrostatic transmission lines L in the non-display region NA. The first reflection structures 31 may be multiplexed as the electrostatic transmission lines L.

Figure 19:
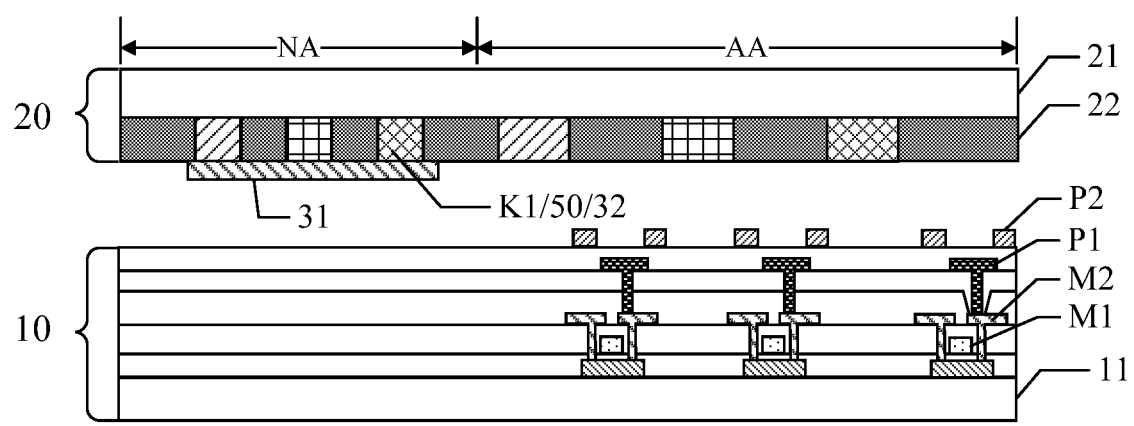
FIG. 19 illustrates another film layer structure of the display panel along a BB direction, consistent with various disclosed embodiments of the present disclosure.

As shown in FIG. 19 and FIG. 20, in one embodiment, the electrostatic transmission lines L may be disposed in the non-display region NA of the display panel. When the external static electricity acts on the display panel, the static electricity may be conducted out through the electrostatic transmission lines L, to avoid further transmission of the static electricity to the display region AA to affect the normal display of the display panel. In this embodiment, the electrostatic transmission lines L may be multiplexed as the first reflection structures 31, and there may be no need to introduce a separate film layer and a manufacturing process for the first reflection structures 31. Therefore, while improving the uniformity of the black state of the display panel in the screen-off state, the manufacturing process after the introduction of the first reflection structures 31 may be also simplified, improving the production efficiency of the display panel.

Figure 21:
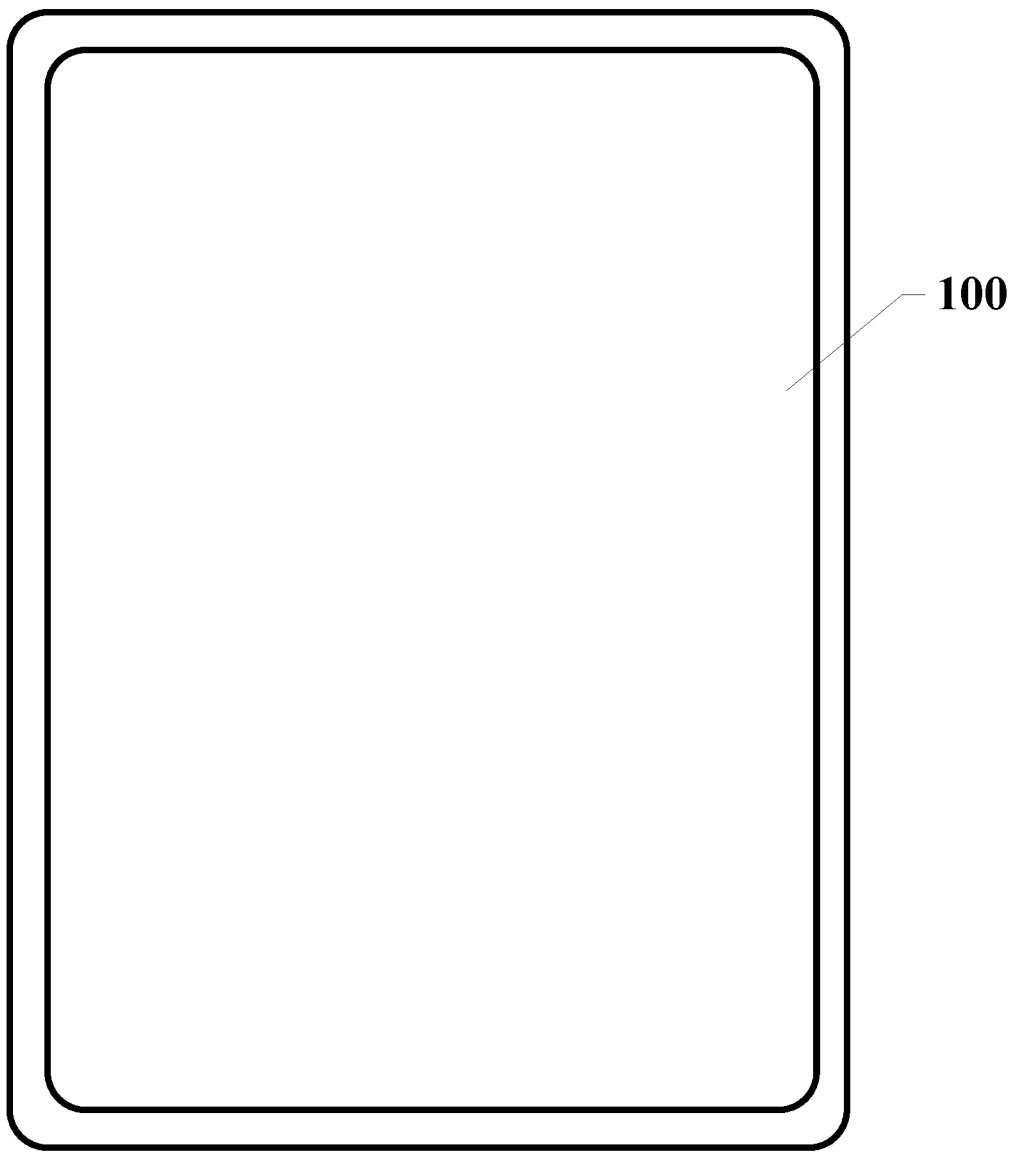
FIG. 21 illustrates an exemplary display device consistent with various disclosed embodiments of the present disclosure.

The present disclosure also provides a display device. As shown in FIG. 21, in one embodiment, the display device 200 may include any display panel 100 provided by various embodiments of the present disclosure.

It should be noted that, for the embodiments of the display device 200 provided by the embodiments of the present disclosure, reference may be made to the embodiments of the display panel 100 described above which are repeatedly pointed out and will not be repeated. The display device 200 provided in the present disclosure may be any display device with display function, such as a mobile phone, a tablet computer, a television, a vehicle display device, and the like.

In the display panel and the display device provided by various embodiments of the present disclosure, the display panel may include the display region and the non-display region at least partially surrounding the display region. The non-display region may be regarded as the frame region. The display panel may further include the first base plate and the second base plate opposite to each other. The second base plate may include the light-blocking layer. In the non-display region, the light-blocking layer may include at least one first opening penetrating through the light-blocking layer along the thickness direction of the light-blocking layer. Especially, the first reflection structures may be also introduced in the non-display region, and the positions of the first reflection structures may correspond to the positions of the at least one first opening. That is, the first reflection structures and the at least one first opening may overlap along the first direction. In the existing technologies, because the materials and patterns of the display region and the non-display region are different, the reflectivity difference between the display region and the non-display region is relatively large, such that the color of the display region is relatively lighter than the non-display region and the black state is uneven. In the present disclosure, the at least one first opening and the first reflection structures may be disposed in the non-display region. In the screen-off state, when external light irradiates the non-display region, the first reflection structures in the non-display region may reflect at least part of the light, thereby improving the reflectivity of the non-display region and reducing the reflectivity difference between the non-display region and the display region in the screen-off state. The problem of the large color difference between the display region and the non-display region in the screen-off state may be alleviated. Therefore, the uniformity of the black state of the product in the screen-off state may be improved, improving the user experience. Further, when the at least one first opening and the first reflection structures are disposed in the non-display region, in the display state, the first reflection structures may block the light inside the display product, preventing the display light from being emitted from the at least one first opening in the non0 display region, preventing the phenomenon of edge light leakage during the display process and ensuring the display effect of the product in the display stage.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display panel, comprising:
   a display region and a non-display region at least partially surrounding the display region;
   a first base plate and a second base plate opposite to each other; and
   first reflection structures and first pixel electrodes in the non-display region and second pixel electrodes in the display region;
   wherein:
   the first base plate includes a first substrate;
   the second base plate includes a light-blocking layer;
   the light-blocking layer includes at least one first opening in the non-display region and includes second openings in the display region;
   along a first direction, the at least one first opening and the second openings penetrate through the light-blocking layer;
   the first direction is a thickness direction of the display panel;
   along the first direction, a projection of a first reflection structure overlaps a projection of a corresponding first opening of the at least one first opening;
   along the first direction, the second pixel electrodes overlap the second openings;
   along the first direction, an overlapping area of one first pixel electrode of the first pixel electrodes and a corresponding first opening of the at least one first opening is S01;
   along the first direction, a projection of the corresponding first opening on the first substrate has a total area S0;
   along the first direction, an overlapping area of one second pixel electrode of the second pixel electrodes and a corresponding second opening of the second openings is S02; and
   along the first direction, a projection of the corresponding second opening on the first substrate has a total area S00, wherein S01/S0>S02/S00.

2. The display panel according to claim 1, wherein the projection of the first reflection structure covers the projection of the corresponding first opening.

3. The display panel according to claim 1, wherein:
   the first reflection structures are made of a material including a metal material.

4. The display panel according to claim 1, wherein:
   along a direction from the display region to the non-display region, an area of the at least one first opening gradually decreases in a case that there are more than one first opening along the direction from the display region to the non-display region.

5. The display panel according to claim 1, further comprising second reflection structures, wherein:
   the second base plate further includes color-resists;
   at least a portion of the color-resists is located in the at least one first opening;
   along the first direction, a projection of a second reflection structure overlaps a projection of a corresponding first opening of the at least one first opening; and
   the color-resists are multiplexed as the second reflection structures.

6. The display panel according to claim 5, wherein:
   along the first direction, the first reflection structures are disposed between the first substrate and the color-resists.

7. The display panel according to claim 5, wherein:
   the color-resists include first color-resists and second color-resists;
   a transmittance of the first color-resists per unit area is larger than a transmittance of the second color-resists per the same unit area; and
   in the non-display region, the area of the at least one first opening corresponding to the first color-resists is S1, and the area of the at least one first opening corresponding to the second color-resists is S2, wherein S1<S2.

8. The display panel according to claim 7, wherein:
   the color-resists further include third color-resists;
   a transmittance of the third color-resists per unit area is lower than the transmittance of the second color-resists per the same unit area;
   in the non-display region, the area of the at least one first opening corresponding to the third color-resists is S3, wherein S2<S3.

9. The display device according to claim 8, wherein:
   the first color-resists are green color-resists, the second color-resists are red color-resists, and the third color-resists are blue color-resists.

10. The display panel according to claim 5, wherein:
    the color-resists in the at least one first opening are all blue color-resists.

11. The display panel according to claim 5, wherein:
    the color-resists include first color-resists and second color-resists;
    a transmittance of the first color-resists per unit area is larger than a transmittance of the second color-resists per the same unit area;
    in the non-display region, the area of the at least one first opening corresponding to the first color-resists and the area of the at least one first opening corresponding to the second color-resists are same; and
    the first color-resists are disposed between the second color-resists and the display region.

12. The display panel according to claim 1, wherein:
the non-display region includes a first non-display region and a second non-display region;
the first non-display region is located between the second non-display region and the display region; and
an area of a first opening, of the at least one first opening, located in the first non-display region is larger than an area of a first opening, of the at least one first opening, located in the second non-display region.

13. The display panel according to claim 12, wherein:
the second base plate further includes color-resists;
at least a portion of the color-resists is located in the at least one first opening;
the color-resists include red color-resists, green color-resists and blue color-resists;
the color-resists further include white color-resists, or at least one of the at least one first opening is filled with a film layer with high transmittance; and
the at lease one of the at least one first opening provided with the white color-resists or the film layer with high transmittance is located in the second non-display region.

14. The display panel according to claim 12, wherein:
an area of a first opening of the at least one first opening located in the first non-display region is equal to an area of a second opening of the second openings located in the display region.

15. The display panel according to claim 1, further comprising third reflection structures, wherein:
along the first direction, a projection of one third reflection structure overlaps a projection of a corresponding first opening of the at least one first opening, and the first pixel electrodes are multiplexed as the third reflection structures.

16. The display panel according to claim 15, wherein:
the first pixel electrodes include N1 electrode strips, and the second pixel electrodes include N2 electrode strips, wherein N1>N2≥2.

17. The display panel according to claim 15, wherein:
the first pixel electrodes include at least one first electrode strip, and the second pixel electrodes include at least one second electrode strip, wherein a width of the at least one first electrode strip is larger than a width of the at least one second electrode strip.

18. The display panel according to claim 1, further including electrostatic transmission lines in the non-display region, wherein:
the first reflection structures are multiplexed as the electrostatic transmission lines.

19. The display panel according to claim 1, wherein an area of a first opening of the at least one first opening in the non-display region is smaller than an area of one of the second openings in the display region.

20. A display device, comprising a display panel, wherein the display panel includes:
a display region and a non-display region at least partially surrounding the display region;
a first base plate and a second base plate opposite to each other; and
first reflection structures and first pixel electrodes in the non-display region and second pixel electrodes in the display region;
wherein:
the first base plate includes a first substrate;
the second base plate includes a light-blocking layer;
the light-blocking layer includes at least one first opening in the non-display region and includes second openings in the display region;
along a first direction, the at least one first opening and the second openings penetrate through the light-blocking layer;
the first direction is a thickness direction of the display panel;
along the first direction, a projection of a first reflection structure overlaps a projection of a corresponding first opening of the at least one first opening;
along the first direction, the second pixel electrodes overlap the second openings;
along the first direction, an overlapping area of one first pixel electrode of the first pixel electrodes and a corresponding first opening of the at least one first opening is S01;
along the first direction, a projection of the corresponding first opening on the first substrate has a total area S0;
along the first direction, an overlapping area of one second pixel electrode of the second pixel electrodes and a corresponding second opening of the second openings is S02; and
along the first direction, a projection of the corresponding second opening on the first substrate has a total area S00, wherein S01/S0>S02/S00.

* * * * *